(12) United States Patent
Obayashi et al.

(10) Patent No.: US 10,964,213 B2
(45) Date of Patent: Mar. 30, 2021

(54) PARKING ASSIST SYSTEM AND PARKING ASSIST METHOD

(71) Applicant: DENSO CORPORATION, Kariya (JP)

(72) Inventors: Hironori Obayashi, Kariya (JP); Waka Sengoku, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/749,098

(22) Filed: Jan. 22, 2020

(65) Prior Publication Data

US 2020/0160710 A1 May 21, 2020

Related U.S. Application Data

(63) Continuation of application No. PCT/JP2018/027637, filed on Jul. 24, 2018.

(30) Foreign Application Priority Data

Jul. 26, 2017 (JP) .............................. JP2017-144330

(51) Int. Cl.
| | |
|---|---|
| *B60Q 1/48* | (2006.01) |
| *G08G 1/14* | (2006.01) |
| *H04W 4/44* | (2018.01) |
| *B64C 39/02* | (2006.01) |

(52) U.S. Cl.
CPC ............ *G08G 1/142* (2013.01); *B64C 39/024* (2013.01); *G08G 1/143* (2013.01); *H04W 4/44* (2018.02)

(58) Field of Classification Search
CPC ......... G08G 1/142; G08G 1/143; H04W 4/44; B64C 39/024

USPC ....................................................... 340/932.2
See application file for complete search history.

(56) References Cited

U.S. PATENT DOCUMENTS

| | | | | |
|---|---|---|---|---|
| 9,266,562 | B2* | 2/2016 | Yamazaki | ............. B62D 5/0496 |
| 9,471,059 | B1* | 10/2016 | Wilkins | ............... G05D 1/0016 |
| 9,773,413 | B1* | 9/2017 | Li | ............................ G08G 1/144 |
| 9,811,085 | B1* | 11/2017 | Hayes | ...................... G06N 5/04 |
| 9,849,978 | B1* | 12/2017 | Carmack | ............... G08G 5/0056 |
| 10,593,212 | B2* | 3/2020 | Yaldo | ......................... G08G 1/14 |
| 2014/0036076 | A1* | 2/2014 | Nerayoff | ............ G06K 9/00791 |
| | | | | 348/148 |

(Continued)

FOREIGN PATENT DOCUMENTS

| | | |
|---|---|---|
| JP | 2009-037553 A | 2/2009 |
| JP | 2014-146130 A | 8/2014 |

(Continued)

*Primary Examiner* — Kerri L McNally
*Assistant Examiner* — Thang D Tran
(74) *Attorney, Agent, or Firm* — Maschoff Brennan

(57) ABSTRACT

A parking assist system for use in a parking lot including parking spaces for a plurality of vehicles includes: a vehicle sensor which determines whether an assisted vehicle attempting to enter or exit one of the parking spaces is a general vehicle that travels through vehicle operation by a driver or an autonomous vehicle capable of self-driving according to an external travel signal; and a travel signal transmitter which, when the assisted vehicle is determined as the general vehicle, transmits, to a specific autonomous vehicle among parked autonomous vehicles, a travel signal for traveling to an available position for enabling the entry or the exit of the assisted vehicle.

6 Claims, 12 Drawing Sheets

(56) References Cited

U.S. PATENT DOCUMENTS

| | | | |
|---|---|---|---|
| 2014/0097971 A1* | 4/2014 | Barth | G01S 15/87 340/932.2 |
| 2014/0350855 A1* | 11/2014 | Vishnuvajhala | G08G 1/144 701/538 |
| 2015/0161890 A1* | 6/2015 | Huntzicker | G08G 1/147 340/932.2 |
| 2015/0279210 A1* | 10/2015 | Zafiroglu | G08G 1/065 340/932.2 |
| 2015/0353080 A1* | 12/2015 | Mukaiyama | E05B 77/54 701/23 |
| 2016/0125736 A1* | 5/2016 | Shaik | G08G 1/14 701/23 |
| 2016/0371609 A1* | 12/2016 | Nordbruch | G06Q 10/02 |
| 2016/0371982 A1* | 12/2016 | Arndt | G08G 1/096811 |
| 2017/0118307 A1* | 4/2017 | Beaurepaire | G08G 1/143 |
| 2017/0161961 A1* | 6/2017 | Salsberg | G07B 1/08 |
| 2017/0237948 A1* | 8/2017 | Quast | B64C 39/024 348/144 |
| 2017/0300803 A1* | 10/2017 | Beavers | H04W 4/021 |
| 2017/0302107 A1* | 10/2017 | Saussele | B60L 53/52 |
| 2017/0329337 A1* | 11/2017 | Kusano | G08G 1/09675 |
| 2017/0329346 A1* | 11/2017 | Latotzki | G05D 1/0088 |
| 2018/0043884 A1* | 2/2018 | Johnson | B62D 15/0285 |
| 2018/0053237 A1* | 2/2018 | Hayes | G08G 1/0141 |
| 2018/0082588 A1* | 3/2018 | Hoffman, Jr. | G08G 1/166 |
| 2018/0164830 A1* | 6/2018 | Moosaei | G05D 1/0246 |
| 2018/0211539 A1* | 7/2018 | Boss | G08G 1/168 |
| 2018/0218604 A1* | 8/2018 | Astigarraga | H04L 67/12 |
| 2018/0354502 A1* | 12/2018 | Yaldo | H04W 4/46 |
| 2019/0236953 A1* | 8/2019 | Peters | G01S 13/04 |

FOREIGN PATENT DOCUMENTS

| | | |
|---|---|---|
| JP | 2014-163911 A | 9/2014 |
| JP | 2015-072651 A | 4/2015 |
| JP | 2016-006605 A | 1/2016 |
| JP | 2016-197314 A | 11/2016 |

* cited by examiner

PARKING ASSIST SYSTEM AND PARKING ASSIST METHOD

CROSS-REFERENCE TO RELATED APPLICATION

This application is based on and claims the benefit of priority from earlier Japanese Patent Application No. 2017-144330 filed Jul. 26, 2017, and the description of which is incorporated herein by reference.

BACKGROUND

Technical Field

The present disclosure relates to vehicle parking assistance.

Related Art

There has been proposed a parking assist method for sensing the usage status of parking spaces in a parking lot and guiding, to a vacant space, a vehicle that has entered the parking lot.

SUMMARY

As an aspect of the present disclosure, a parking assist system is provided which is for use in a parking lot including parking spaces for a plurality of vehicles. The parking assist system includes: a vehicle sensor which determines whether an assisted vehicle attempting to enter or exit one of the parking spaces is a general vehicle that travels through vehicle operation by a driver or an autonomous vehicle capable of self-driving according to an external travel signal; and a travel signal transmitter which, when the assisted vehicle is determined as the general vehicle, transmits, to a specific autonomous vehicle among parked autonomous vehicles, a travel signal for traveling to an available position for enabling the entry or the exit of the assisted vehicle.

DETAILED DESCRIPTION OF THE PREFERRED EMBODIMENTS

There has been proposed a parking assist method for sensing the usage status of parking spaces in a parking lot and guiding, to a vacant space, a vehicle that has entered the parking lot (for example, refer to JP 2009-037553 A).

Recent years have seen growing prevalence of autonomous vehicles which drive themselves independently of vehicle operation by drivers, and as a result, the autonomous vehicles and existing general vehicles which travel through vehicle operation by drivers are expected to be parked side by side in a parking lot. In the parking assist method proposed in the above patent literature, an autonomous vehicle and a general vehicle are not, in fact, expected to be parked side by side. Therefore, the inventors found a demand for a new parking assist method to be used under a situation in which an autonomous vehicle and a general vehicle are parked side by side.

The present disclosure responds to the demand for a new parking assist method to be used under a situation in which an autonomous vehicle and a general vehicle are parked side by side.

Figure 1:
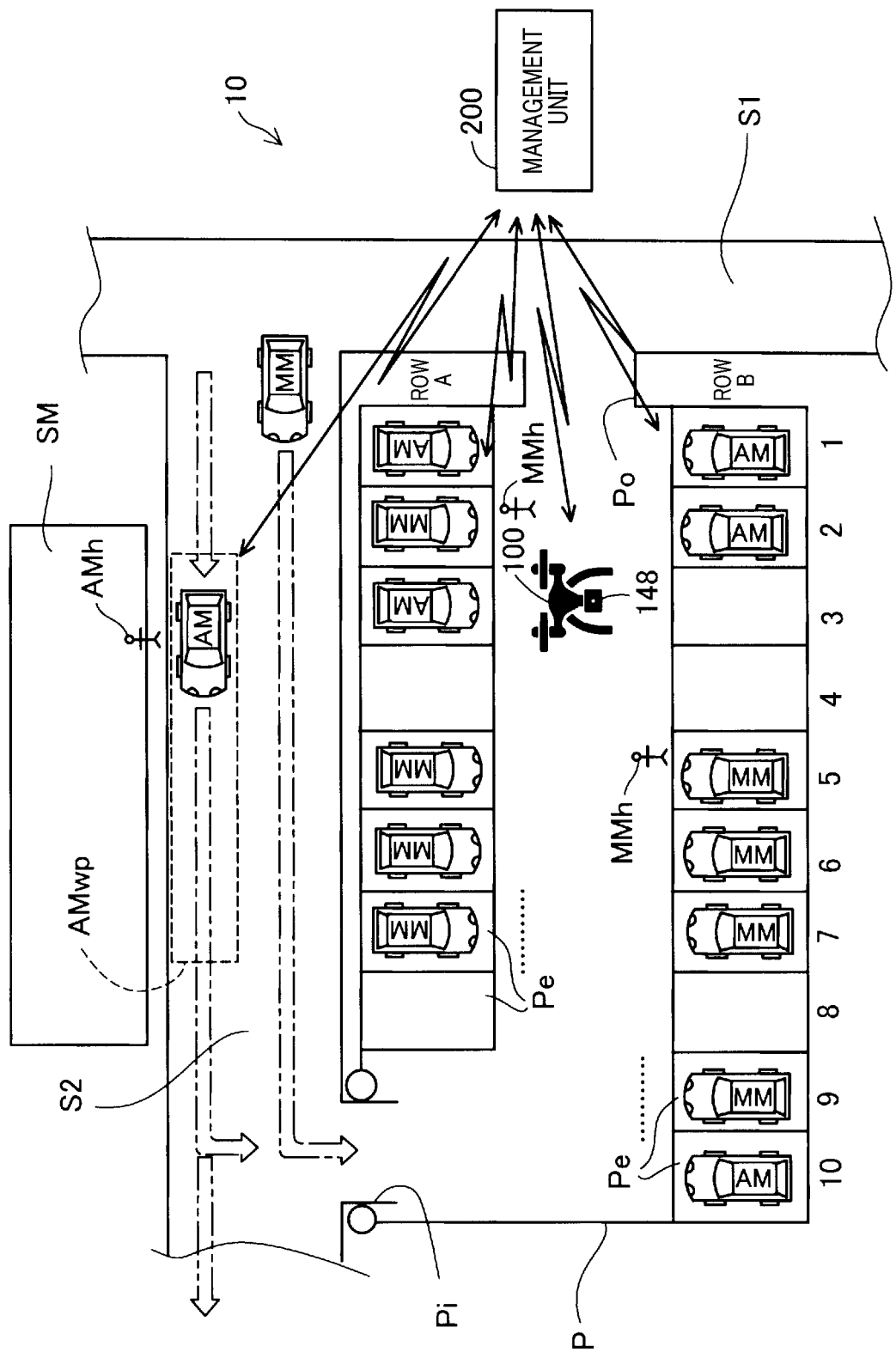
FIG. 1 is a schematic diagram schematically showing a parking assist system as an embodiment of the present disclosure.

A parking assist system 10 shown in FIG. 1 includes: a mobile body 100 which senses behavior of a vehicle itself, a human body near the vehicle, and the like in a parking lot P; and a management unit 200 which assists a general vehicle MM and an autonomous vehicle AM in the parking lot P to enter and exit a parking space Pe. The parking lot P is established within a shopping mall SM and includes parking spaces Pe for a plurality of vehicles. In the present embodiment, two rows of the parking spaces Pe, namely, row A and row B, are provided, and a plurality of parking spaces Pe are aligned in each of these rows. In the following description, the parking spaces Pe are referred to as a parking space Pe at No. 3 in the row A or a parking space Pe at No. 9 in the row B, for example, to distinguish the parking spaces Pe.

In the present embodiment, an unmanned aerial vehicle, also known as a drone, is used as the mobile body 100. The mobile body 100 is capable of identifying the current position using a landmark, etc., installed in the parking lot P. This mobile body 100 includes a sensing device which senses a human body and the like near a vehicle, for example, a camera 148, and flies in the air and constantly transmits an image captured by the camera 148 to the management unit 200. Specifically, the mobile body 100 captures images of not only the parking space Pe to determine vacancy, but also a vehicle entering through an entrance Pi and a pedestrian (a driver of a general vehicle) approaching and boarding a vehicle parked (stored) in the parking space Pe, for example, and transmits the captured images to the management unit 200. In addition, the mobile body 100 receives an entry/exit request from the autonomous vehicle AM that is controlled to automatically enter or exit the parking lot P and transmits the received entry/exit request to the management unit 200 together with, or separately from, the captured images. The number of mobile bodies 100 can be defined according to the size of the parking lot; a plurality of mobile bodies 100 may be used in the parking assist system 10 for a parking lot that accommodates a larger number of vehicles than in the parking lot P shown in FIG. 1. Note that the functions of the mobile body 100 related to entry and exit of vehicles will be described later.

On the basis of the captured image and the entry/exit request or the like from the autonomous vehicle AM that have been received from the mobile body 100, the management unit 200 determines whether the assisted vehicle is a general vehicle MM or an autonomous vehicle AM, specifies the parking space Pe for the autonomous vehicle AM and the general vehicle MM to park, creates an entry route for the autonomous vehicle AM to reach the specified parking space Pe, creates an exit route for the autonomous vehicle AM parked in the parking space Pe, and transmits a travel signal for the created entry/exit route, for example. Thus, the management unit 200 constitutes a travel signal transmitter according to the present disclosure and moreover, in cooperation with the mobile body 100, constitutes a vehicle sensor according to the present disclosure. Note that sensing, etc., of the assisted vehicle will be described later.

The autonomous vehicle AM is capable of traveling on the basis of vehicle operation by a driver and capable of driving itself according to an external travel signal. In order to drive itself, the autonomous vehicle AM includes: the function of transmitting an entry request and an exit request; and the function of obtaining travel signals for the entry route, the exit route, etc., created by the management unit 200 and traveling according to the obtained route. The autonomous vehicle AM drives itself in the parking lot according to the entry route and the exit route obtained from the management unit 200. In the present embodiment, self-driving includes traveling in both of the cases where a driver is in the autonomous vehicle AM (also referred to as manned self-driving) and where no driver is in the autonomous vehicle AM (also referred to as unmanned self-driving). Upon self-driving in the parking lot, the autonomous vehicle AM enters an internal road S2 from an external road S1, discharges an autonomous vehicle driver AMh and other passengers in an occupant boarding/alighting area AMwp on the internal road S2, and then enters the parking space Pe in the parking lot P by self-driving as described later. Furthermore, after exiting the parking space Pe through an exit Po by self-driving, the autonomous vehicle AM arrives at the occupant boarding/alighting area AMwp, and after the autonomous vehicle driver AMh sits in the driver seat, the autonomous vehicle AM travels out of the facility through vehicle operation by the autonomous vehicle driver AMh. Upon such self-driving, the autonomous vehicle AM outputs the entry request, the exit request, and the like.

The general vehicle MM travels through vehicle operation by a driver and enters the parking lot P through the entrance Pi and is parked in the parking space Pe in which no other vehicles are parked (vacant parking space Pe) through vehicle operation by a general vehicle driver MMh. Upon exiting, the general vehicle MM travels out of the facility through the exit Po by the general vehicle driver MMh sitting in the driver seat and then performing vehicle operation. Note that vehicle drivers are distinguished by being referred to as the autonomous vehicle driver AMh and the general vehicle driver MMh.

Figure 2:
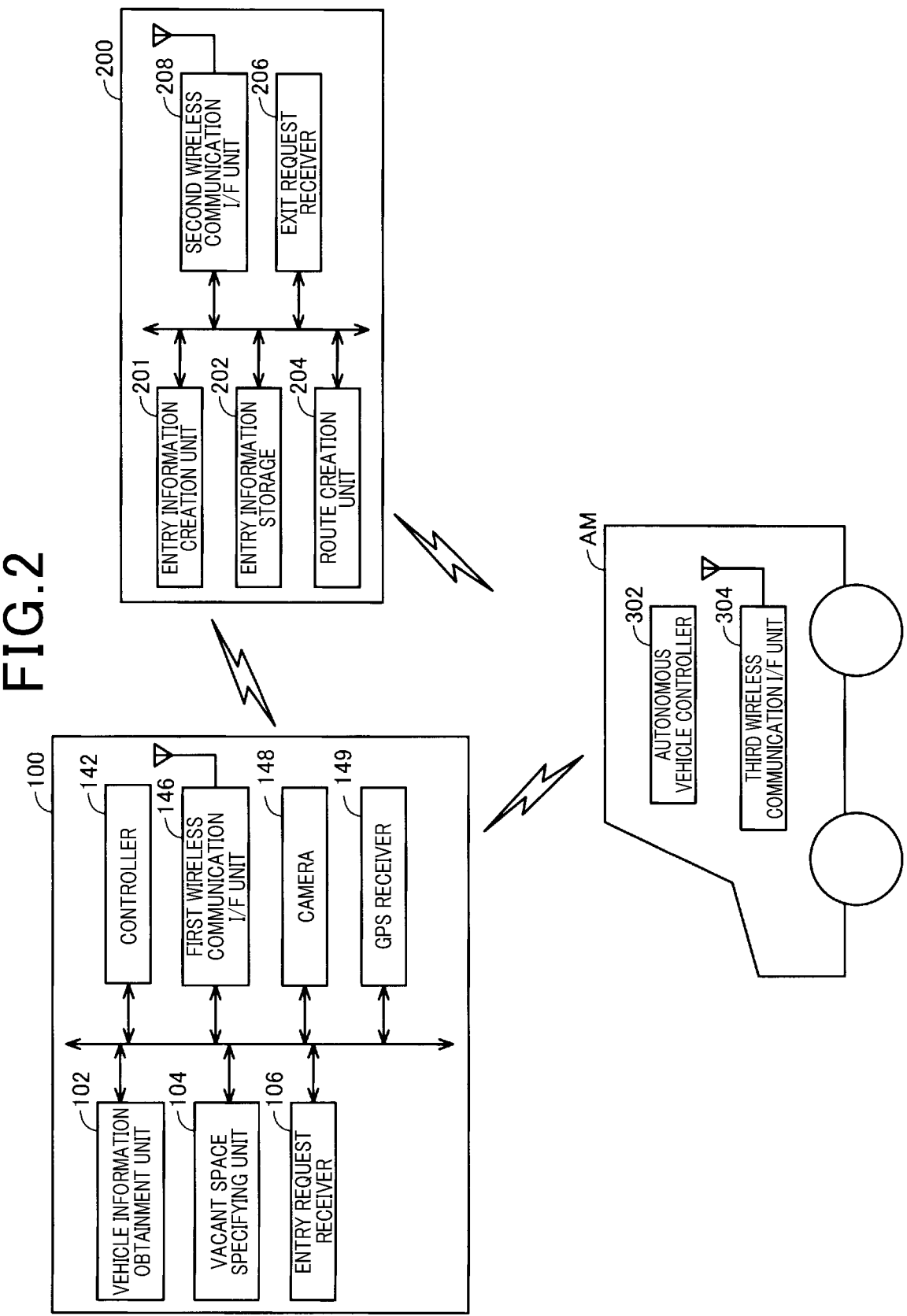
FIG. 2 is a block diagram showing a schematic configuration of the parking assist system.

As shown in FIG. 2, the mobile body 100 includes: a controller 142 which controls movement of the mobile body 100; a camera 148; a GPS receiver 149; a vehicle information obtainment unit 102 which obtains information about entering and exiting vehicles; a vacant space specifying unit 104 which specifies a vacant parking space Pe in which no other vehicles are parked; an entry request receiver 106 which receives the entry request from the autonomous vehicle AM; and a first wireless communication I/F unit 146. The mobile body 100 includes a computer with a CPU, a ROM, and a RAM, which are not shown in the drawings. This CPU develops, in the RAM, a control program stored in advance in the ROM and executes the control program; thus, the functions of the respective units indicated above are implemented.

The vehicle information obtainment unit 102 obtains various kinds of information of the assisted vehicle that is using the parking space, i.e., entering or exiting the parking space Pe. For example, in the case of entry into the parking space Pe, on the basis of an image of the vehicle (assisted vehicle) captured by the camera 148 when the vehicle moves from the internal road S2 to the entrance Pi in FIG. 1 while the mobile body 100 is flying, vehicle information necessary for determining whether said vehicle is a general vehicle MM or an autonomous vehicle AM is obtained. Specifically, when a driver is already seated in the driver seat of the vehicle in the captured image and the vehicle is traveling through vehicle operation (steering operation) by the driver, such a captured image is informative in determining the assisted vehicle as a general vehicle MM that is entering the parking space Pe.

In the case of exit from the parking space Pe, on the basis of an image of a pedestrian captured by the camera 148 when the pedestrian approaches a vehicle parked in the parking space Pe in the row A or B while the mobile body 100 is flying, vehicle information necessary for determining whether the vehicle which said pedestrian is getting in is a general vehicle MM or an autonomous vehicle AM is obtained. Specifically, when the image captured by the camera 148 includes a pedestrian approaching a vehicle parked in the parking space Pe, the vehicle information obtainment unit 102 causes the mobile body 100 to fly following the pedestrian, and the camera 148 captures images of an event in which the pedestrian sits in the driver seat of the vehicle parked in the parking space Pe, an event in which the pedestrian in the vehicle performs steering operations (gripping the steering wheel), and an event in which said vehicle moves forward even slightly, for example. The captured images of such events are informative in determining the assisted vehicle as a general vehicle MM that is exiting the parking space Pe. Thus, the vehicle information obtainment unit 102 analyzes the image captured by the camera 148 and obtains vehicle information necessary for determining whether the assisted vehicle is a general vehicle MM. The obtained vehicle information is transmitted to the management unit 200 via the first wireless communication I/F 146 of the mobile body 100.

The vacant space specifying unit 104 specifies a vacant parking space Pe in which no other vehicles are parked using positioning data obtained by the GPS receiver 149 and the image of the parking space Pe in each of the rows A and B captured by the camera 148 while the mobile body 100 is flying. Specifically, when no other vehicles are parked, the captured image includes no external image of a vehicle, and thus the parking space Pe in which no external image of a vehicle is included is considered as a vacant parking space Pe, and the position of this vacant parking space Pe is detected using the positioning data.

The vacant space specifying unit 104 may detect the position of the vacant parking space Pe using, for example, a sensor such as a millimeter wave radar instead of the camera 148 or in addition to the camera 148. Position information on the detected vacant parking space Pe is transmitted to the management unit 200 via the first wireless communication I/F 146 of the mobile body 100.

The entry request receiver 106 waits to receive the entry request output by the autonomous vehicle AM, and when receiving the entry request, outputs the entry request to the management unit 200 via the first wireless communication I/F unit 146.

The first wireless communication I/F unit 146 demodulates radio waves received via an antenna and thus generates data, and generates and modulates radio waves to be transmitted via the antenna. As the wireless communication, for example, wireless communication according to not only standardized communication methods such as various wireless local area networks (LANs) defined in the Institute of Electrical and Electronics Engineers (IEEE) 802.11, Z-Wave (registered trademark), Zigbee (registered trademark), and Bluetooth (registered trademark), but also wireless communication according to arbitrary communication methods that have not been standardized can be used.

The management unit 200 is positioned so as to be able to communicate and exchange data with the occupant boarding/alighting area AMwp and the interior of the parking lot P, and includes an entry information creation unit 201, an entry information storage 202, a route creation unit 204, a second wireless communication I/F unit 208, and an exit request receiver 206. The management unit 200 includes a computer with a CPU, a ROM, and a RAM, which are not shown in the drawings. This CPU transfers, into the RAM, a control program stored in advance in the ROM and executes the control program; thus, the functions of the respective units indicated above are implemented.

The entry information creation unit 201 creates entry information indicating an entry situation in the parking space Pe using the information about the vacant parking space Pe that has been received from the mobile body 100, and stores the created entry information into the entry information storage 202. Furthermore, the entry information creation unit 201 updates, on an as-needed basis, the entry information stored in the entry information storage 202.

The route creation unit 204 creates entry and exit routes for the autonomous vehicle AM. Specifically, the route creation unit 204 creates: entry route information for the autonomous vehicle AM from which the autonomous vehicle driver AMh has alighted in the occupant boarding/alighting area AMwp in FIG. 1 to drive itself from the occupant boarding/alighting area AMwp to the parking space Pe in which said vehicle is to be parked; and exit route information for the autonomous vehicle AM parked (stored) in the parking space Pe to drive itself from said parking space Pe to the occupant boarding/alighting area AMwp, and transmits the entry route information and the exit route information to the autonomous vehicle AM. When receiving the entry request from the mobile body 100, the route creation unit 204 creates the entry route information, and when receiving the exit request from the autonomous vehicle AM, the route creation unit 204 creates the exit route information. In the present embodiment, upon entry of the autonomous vehicle AM into the parking space Pe by self-driving, reverse parking is done as shown in FIG. 1, but forward parking may instead be done. Note that the management unit 200 may directly receive the entry request from the autonomous vehicle AM, and using this request reception as a trigger, the route creation unit 204 may create the entry route for the autonomous vehicle AM.

The exit request receiver 206 waits to receive the exit request output by the autonomous vehicle AM. When the exit request receiver 206 receives the exit request, the route creation unit 204 creates an exit route for the autonomous vehicle AM corresponding to the exit request to drive itself to the occupant boarding/alighting area AMwp from the parking space Pe in which the autonomous vehicle AM has been parked.

The second wireless communication I/F unit 208 has substantially the same configuration as the first wireless communication I/F unit 146. The management unit 200 communicates with the mobile body 100 and the autonomous vehicle AM via the second wireless communication I/F unit 208.

The autonomous vehicle AM includes a self-driving controller 302 and a third wireless communication I/F unit 304. The autonomous vehicle AM includes an electronic control unit (ECU) with a CPU, a ROM, and a RAM, which are not shown in the drawings. This CPU develops, in the RAM, a control program stored in advance in the ROM and executes the control program; thus, the functions of the respective units indicated above are implemented.

The self-driving controller 302 transmits the entry request, the exit request, etc., via the third wireless communication I/F unit 304. For example, when the autonomous vehicle driver AMh or a passenger of the autonomous vehicle AM provides an automatic entry instruction through an automatic entry instruction button provided in the interior of the autonomous vehicle AM, the self-driving controller 302 outputs the entry request. Furthermore, for example, when the exit instruction transmitted from a mobile cellphone unit by a user of the autonomous vehicle AM is received via the third wireless communication I/F unit 304, the self-driving controller 302 outputs the exit request. The entry request and the exit request output in this manner include identification data for identifying a vehicle, and thus the mobile body 100 and the management unit 200 which receive the entry request and the exit request are capable of identifying and specifying the autonomous vehicle AM that has output the requests. Furthermore, using the entry route information and the exit route information received from the management unit 200 via the third wireless communication interface unit 304, the self-driving controller 302 controls self-driving of the own vehicle and performs automatic entry into and exit from a parking space.

As with the first wireless communication I/F unit 146, the third wireless communication I/F unit 304 demodulates radio waves received via an antenna and thus generates data, and generates and modulates radio waves to be transmitted via the antenna. The third wireless communication I/F unit 304 is configured to be able to perform not only the aforementioned communication methods, but also communication via a wide-area network. Examples of the wide-area network include communication networks owned by various telecommunication carriers, such as a cell-phone network, local area networks (LANs) connected to these communication networks, and the Internet.

Entry/exit assistance for the autonomous vehicle AM using the parking assist system 10 according to the present embodiment will be described. This entry/exit assistance is implemented by the management unit 200 following the procedure shown in FIG. 3; first, management unit 200 waits to receive the entry/exit request from the autonomous vehicle AM (Step S102). During this wait for input and during a process thereafter, the mobile body 100 flies above the parking lot P while capturing images of the parking lot P by the camera 148, and transmits, to the management unit 200, the vehicle information obtained by the vehicle information obtainment unit 102 and the entry request received by the entry request receiver 106. Note that the images captured by the camera 148 may be transmitted to the management unit 200, and the management unit 200 may obtain the vehicle information as with the vehicle information obtainment unit 102 of the mobile body 100.

When there is the entry/exit request from the autonomous vehicle AM in Step S102, the management unit 200 specifies an autonomous vehicle AM on the basis of the identification data included in the entry/exit request (Step S104), and determines whether the input request is the entry request (Step S106). Here, when the input request is the entry request, the management unit 200 implements entry assistance for the autonomous vehicle AM (Step S107). In this entry assistance, the current parking situation is determined on the basis of the entry information of the parking space Pe stored in the entry information storage 202, and moreover the route creation unit 204 creates the entry route for the autonomous vehicle AM that has output the input request, and the created entry route is transmitted as a travel signal to the autonomous vehicle AM that has output the entry request. For example, in the parking situation shown in FIG. 1, the parking spaces Pe at Nos. 4 and 8 in the row A and Nos. 3, 4, and 8 in the row B are determined as vacant parking spaces Pe on the basis of the entry information of the parking spaces Pe stored in the entry information storage 202. Subsequently, the parking space Pe at No. 8 in the row A which is closest to the entrance Pi among these vacant parking spaces Pe is defined as a target parking space Pe, and the entry route for the autonomous vehicle AM to drive itself from the occupant boarding/alighting area AMwp to the parking space Pe at No. 8 in the row A is created and transmitted. The autonomous vehicle AM that has received this entry route drives itself to the parking space Pe at No. 8 in the row A along the received entry route and enters this parking space Pe by the self-driving controller 302.

Subsequent to the above-described entry assistance for the autonomous vehicle AM (Step S107), the management unit 200 updates the entry information stored in the entry information storage 202 and stores entry information indicating that the parking space Pe at No. 8 in the row A is occupied (Step S108), and ends the control for the moment. Note that the entry information stored upon update includes the identification information of the autonomous vehicle AM parked in the parking space Pe at No. 8 in the row A.

Upon determination of the parking situation in the above-described entry assistance for the autonomous vehicle AM (Step S107), the parking space Pe for the autonomous vehicle AM that has output the entry request can be selected in order from closest to the entrance Pi, or alternatively the target parking space Pe may be selected from among the vacant parking spaces Pe in order from farthest from the entrance Pi, or alternatively the target parking space Pe may be selected at random. The target parking space Pe may be selected from among the vacant parking spaces Pe adjacent to the parking space Pe in which the autonomous vehicle AM is already stored. This enables the autonomous vehicles AM to be parked side by side. Aside from this, in the case where the parking lot P is larger than that shown in FIG. 1 and accommodate a few dozens to at least a hundred vehicles, whether there is a vacant parking space Pe in a predetermined range of distances such as 50 m and 100 m centered on the autonomous vehicle AM that has arrived at the entrance Pi is determined first. Next, when there is a vacant parking space Pe in the predetermined range, the entry route to this parking space Pe is created and transmitted, and when there is no vacant parking space Pe in the predetermined range, whether there is a vacant parking space Pe is determined in a wider range.

Figure 4:
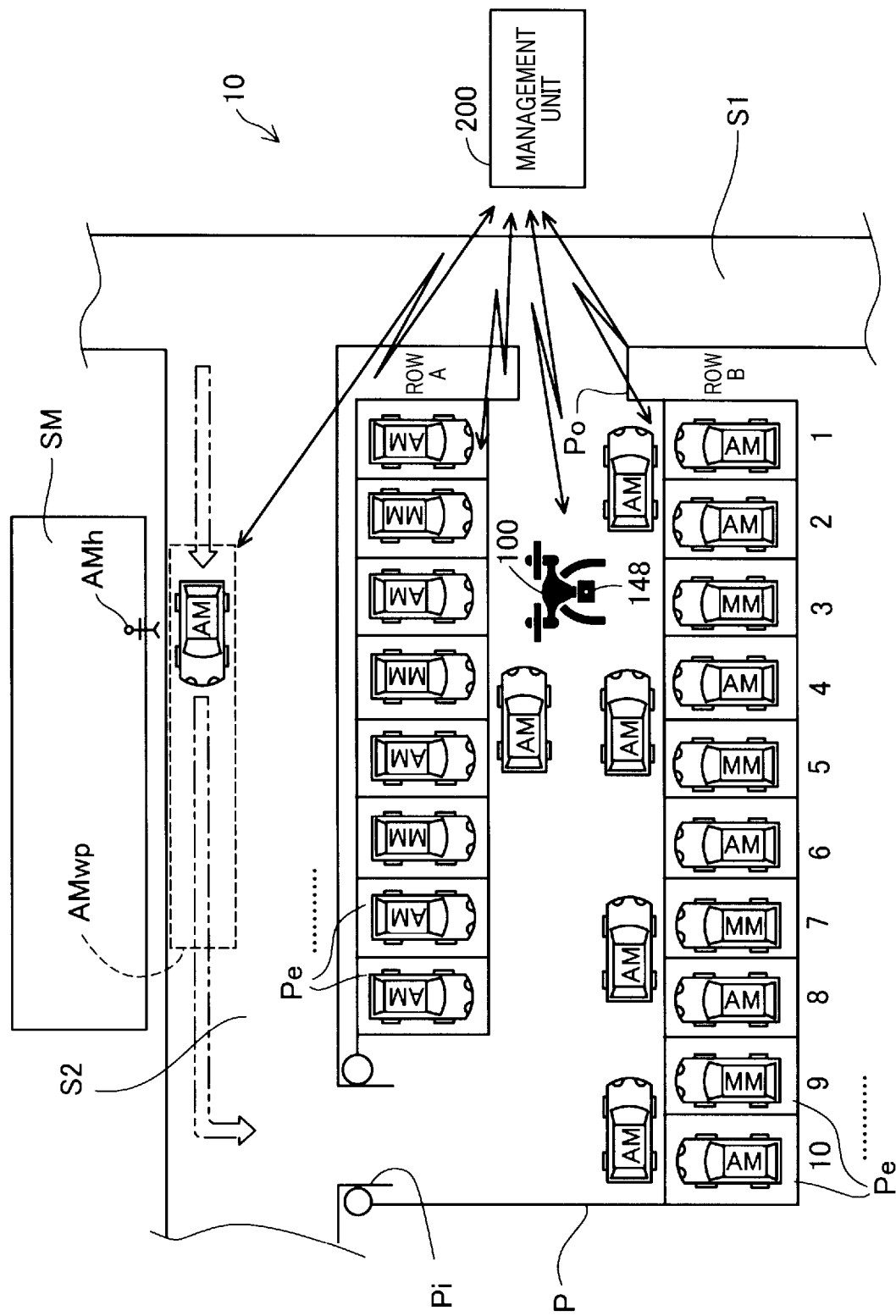
FIG. 4 is an explanatory diagram showing an example of a parking situation for the autonomous vehicle that is brought about by the entry control on the autonomous vehicle.

When the above-described entry assistance for the autonomous vehicle AM (Step S107) is repeated, all the parking spaces Pe will eventually be occupied, but more autonomous vehicles AM can be parked (stored) according to a parking situation determination to the effect that the autonomous vehicles AM can be parked (stored) in an area other than the parking spaces Pe. This situation is shown in FIG. 4; even when vehicles are stored in all the parking spaces Pe in the rows A and B, the autonomous vehicle AM can be parked in a travel space in front of the parking spaces Pe. In order to provide parking assistance (entry assistance) for the autonomous vehicle AM as shown in FIG. 4, when all the parking spaces Pe are occupied, the travel space in front of Nos. 4 and 5 in the row A, the travel space in front of Nos. 4 and 5 in the row B, the travel space in front of Nos. 7 and 8 in the row B, and the travel space in front of Nos. 9 and 10 in the row B are determined, as shown in FIG. 4, as the parking position of the autonomous vehicle AM that has transmitted a new entry request. Furthermore, the entry route for the autonomous vehicle AM from the occupant boarding/alighting area AMwp to the determined parking position is created, and the created entry route is transmitted to the autonomous vehicle AM. Accordingly, the autonomous vehicle AM drives itself to the travel space in front of the parking space Pe. Upon self-driving and parking for the travel space in front of the parking space Pe, first, the travel space in front of the parking spaces Pe in which the autonomous vehicles AM are stored side by side is set to a preferential parking position, keeping the autonomous vehicle AM from not being parked, whenever possible, in the travel space in front of the parking space Pe in which the general vehicle MM is stored. The travel space parking position in which the autonomous vehicle AM is parked in this manner becomes a use obstructing position in which the exit from the parking spaces Pe at Nos. 4 and 5 in the row A, etc., is obstructed. Solving this obstruction to the exit will be described later.

Figure 3:
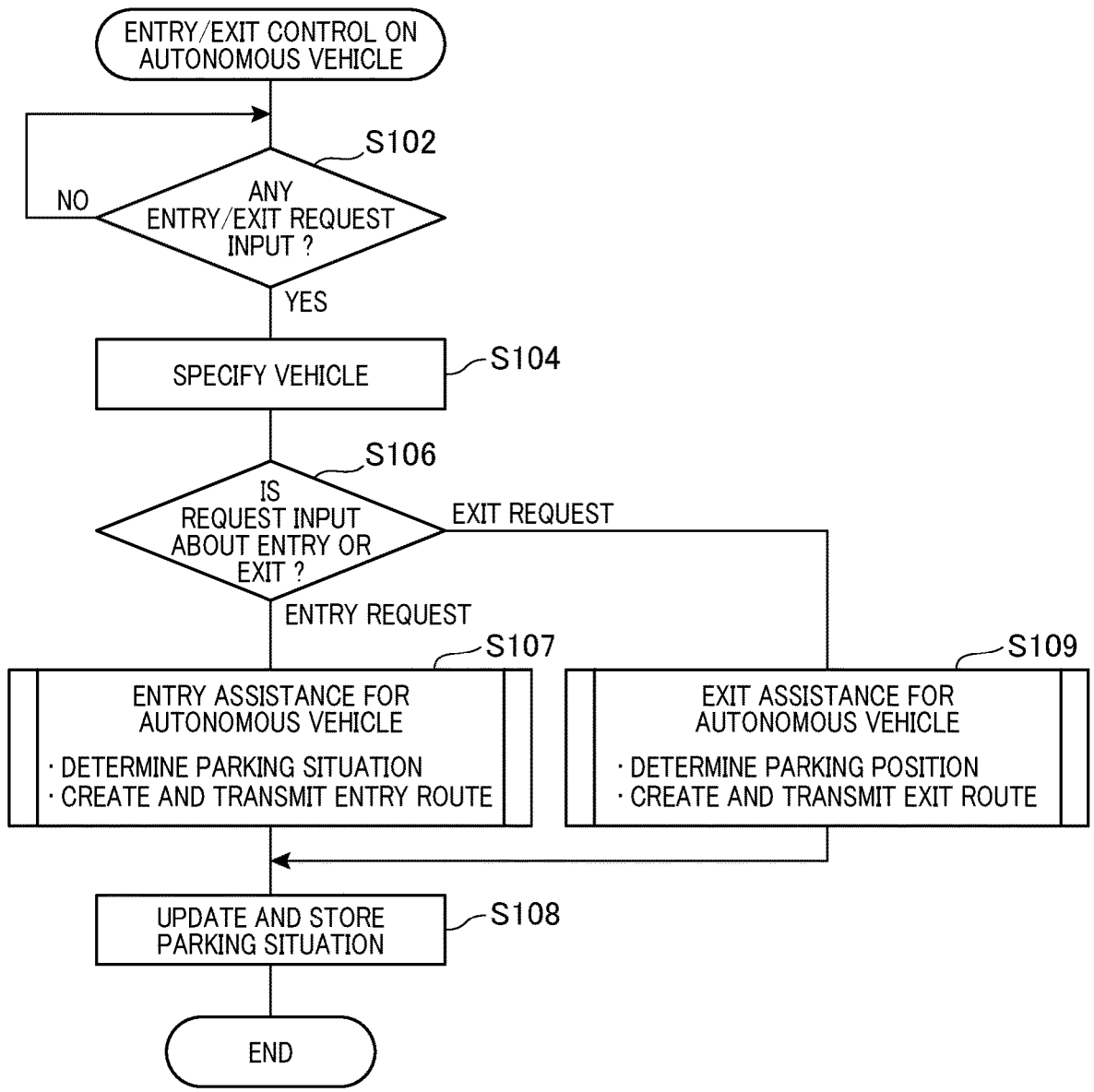
FIG. 3 is a flowchart showing an entry/exit control on an autonomous vehicle in the parking assist system.

On the other hand, when the input request is determined as the exit request in Step S106 in the entry/exit control in FIG. 3, the management unit 200 implements exit assistance for the autonomous vehicle AM (Step S109). In this exit assistance, the parking space Pe in which the autonomous vehicle AM that has transmitted the exit request is stored is found first on the basis of the entry information on the parking space Pe stored in the entry information storage 202, specifically, an identification mark of the autonomous vehicle AM that has transmitted the exit request and information about the parking space Pe associated with the autonomous vehicle AM having said identification mark. Next, the route creation unit 204 creates the exit route for the autonomous vehicle AM that has transmitted the exit request, and the created exit route is transmitted as a travel signal to the autonomous vehicle AM that has output the output request. Different scenes of this case will be described.

In the normal exit assistance, only the autonomous vehicle AM that has transmitted the exit request is caused to drive itself. Specifically, when the autonomous vehicle AM that has transmitted the exit request is a vehicle stored (parked) in the parking space Pe at No. 6 in the row B shown in FIG. 4, no vehicle is parked in front of said parking space Pe. Thus, it is sufficient that only the autonomous vehicle AM that has transmitted the exit request be caused to drive itself; as a result, a travel signal for the exit route for the autonomous vehicle AM to drive itself from the parking space Pe at No. 6 in the row B to the occupant boarding/alighting area AMwp is created and transmitted. The autonomous vehicle AM that has received this exit route exits the parking space Pe at No. 6 in the row B and then drives itself to the occupant boarding/alighting area AMwp along the received exit route according to the self-driving controller 302.

Another form of the normal exit assistance is for when the autonomous vehicle AM that has transmitted the exit request is a vehicle parked in the travel space in front of the parking spaces Pe at Nos. 4 and 5 in the row A shown in FIG. 4. Even in the case of such an autonomous vehicle AM parked in the travel space, since it is sufficient that only said autonomous vehicle AM be caused to drive itself, the exit route for the autonomous vehicle AM to drive itself from the parking position to the occupant boarding/alighting area AMwp is created and transmitted. The autonomous vehicle AM that has received this exit route drives itself from the parking position in the travel space to the occupant boarding/alighting area AMwp along the received exit route according to the self-driving controller 302. The same applies to the autonomous vehicle AM parked in the parking space in front of the parking spaces Pe in the row B.

On the other hand, when the autonomous vehicle AM that has transmitted the exit request is a vehicle stored (parked) in the parking space Pe at No. 1 in the row B or No. 5 in the row A shown in FIG. 4, since the autonomous vehicle AM is parked in the travel space in front of said parking space Pe, the autonomous vehicle AM stored (parked) in the parking space Pe and the autonomous vehicle AM parked in the travel space are sequentially caused to drive themselves as follows. The autonomous vehicle AM parked in the travel space is at the use obstructing position in which the exit of the autonomous vehicle AM from the parking space Pe at No. 5 in the row A is obstructed, and thus a travel route for the autonomous vehicle AM to drive itself (drive itself backward) to an available position for enabling the exit of the autonomous vehicle AM stored (parked) in the parking space Pe at No. 5 in the row A, for example, the travel space located in front of the parking space Pe at No. 8 in the row A, is created and transmitted first. The autonomous vehicle AM that has received the travel route drives itself backward to the travel space in front of the parking space Pe at No. 8 in the row A and is parked in that position. As a result, the exit of the autonomous vehicle AM from the parking space Pe at No. 5 in the row A is no longer obstructed, and thus the exit route for the autonomous vehicle AM to drive itself from the parking space Pe at No. 5 in the row A to the occupant boarding/alighting area AMwp is created and transmitted. The autonomous vehicle AM that has received this exit route exits the parking space Pe at No. 5 in the row A and then drives itself to the occupant boarding/alighting area AMwp along the received exit route according to the self-driving controller 302. The same applies to the case where the autonomous vehicle AM stored in the parking space Pe at No. 1, 2, 8, or 10 in the row B transmits the exit request.

Subsequent to the above-described exit assistance for the autonomous vehicle AM (Step S109), the management unit 200 updates the entry information stored in the entry information storage 202 and stores entry information indicating that the parking space Pe at No. 6 in the row B is a vacant parking space Pe (Step S108), and ends the control for the moment. In the case of the above-described exit assistance for the autonomous vehicle AM stored (parked) in the parking space Pe at No. 5 in the row A, the management unit 200 updates the entry information stored in the entry information storage 202 and stores entry information indicating that the parking space Pe at No. 5 in the row A is a vacant parking space Pe.

Next, entry/exit assistance for the general vehicle MM using the parking assist system 10 according to the present embodiment will be described. This entry/exit assistance is implemented by the management unit 200 following the procedure shown in FIG. 5; first, various types of information necessary for determining whether the assisted vehicle attempting to enter or exit the parking space Pe is an autonomous vehicle AM or a general vehicle MM is obtained (Step S200). Specifically, as mentioned earlier, the vehicle information obtainment unit 102 of the mobile body 100 obtains various types of information about the assisted vehicle from the image of a vehicle (assisted vehicle) captured by the camera 148 when the vehicle (assisted vehicle) moves from the internal road S2 to the entrance Pi in FIG. 1, and thus the management unit 200 receives such information transmitted from the vehicle information obtainment unit 102. Note that the management unit 200 may receive, instead of the image captured by the mobile body 100 or in addition to the image captured by the mobile body 100, images captured by surveillance cameras installed in various portions of the parking lot P, and create various types of information about the assisted vehicle by analyzing the captured images.

Next, whether the assisted vehicle is an autonomous vehicle AM or a general vehicle MM is determined on the basis of the information obtained in Step S200, specifically, the image (observation result) captured by the camera 148 on the mobile body 100 (Step S202). Here, when the assisted vehicle is determined as an autonomous vehicle AM, the entry/exit assist control on the general vehicle MM is ended because the assistance control on the autonomous vehicle AM shown in FIG. 3 is performed. Note that the information obtainment in Step S200 and the vehicle determination in Step S202 in the entry/exit assist control on the general vehicle in FIG. 5 fulfill the functions of the vehicle sensor.

When the assisted vehicle is determined as a general vehicle MM in Step S202, the management unit 200 observes various behaviors of the general vehicle MM (assisted general vehicle STM) which is a mobile vehicle (Step S204). Specifically, vehicle travel behavior caused by vehicle operation (steering operation) by the driver as mentioned above, travel behavior of an entering vehicle that has entered through the entrance Pi, driver-seat boarding behavior of a pedestrian approaching the vehicle parked in the parking space Pe, steering (steering wheel gripping) behavior of the pedestrian after boarding, and subsequent small pull-away behavior, and the like are observed in the image captured by the camera 148 of the mobile body 100. Upon such behavior observation, instead of the image captured by the mobile body 100 or in addition to the image captured by the mobile body 100, the images captured by the surveillance cameras installed in various portions of the parking lot P may be received, and the behavior may be observed by analyzing the captured images.

Next, whether the observed behavior is related to the entry into the parking space Pe is determined (Step S206), and when the observed behavior which is the observation result is entry behavior, the entry assistance for the general vehicle is implemented (Step S210), and when the observed behavior is exit behavior, the exit assistance for the general vehicle is implemented (Step S250). Note that the behavior observation in Step S204 and the entry determination in Step S206 in the entry/exit assist control on the general vehicle in FIG. 5 fulfill the functions of the vehicle sensor.

Figure 6:
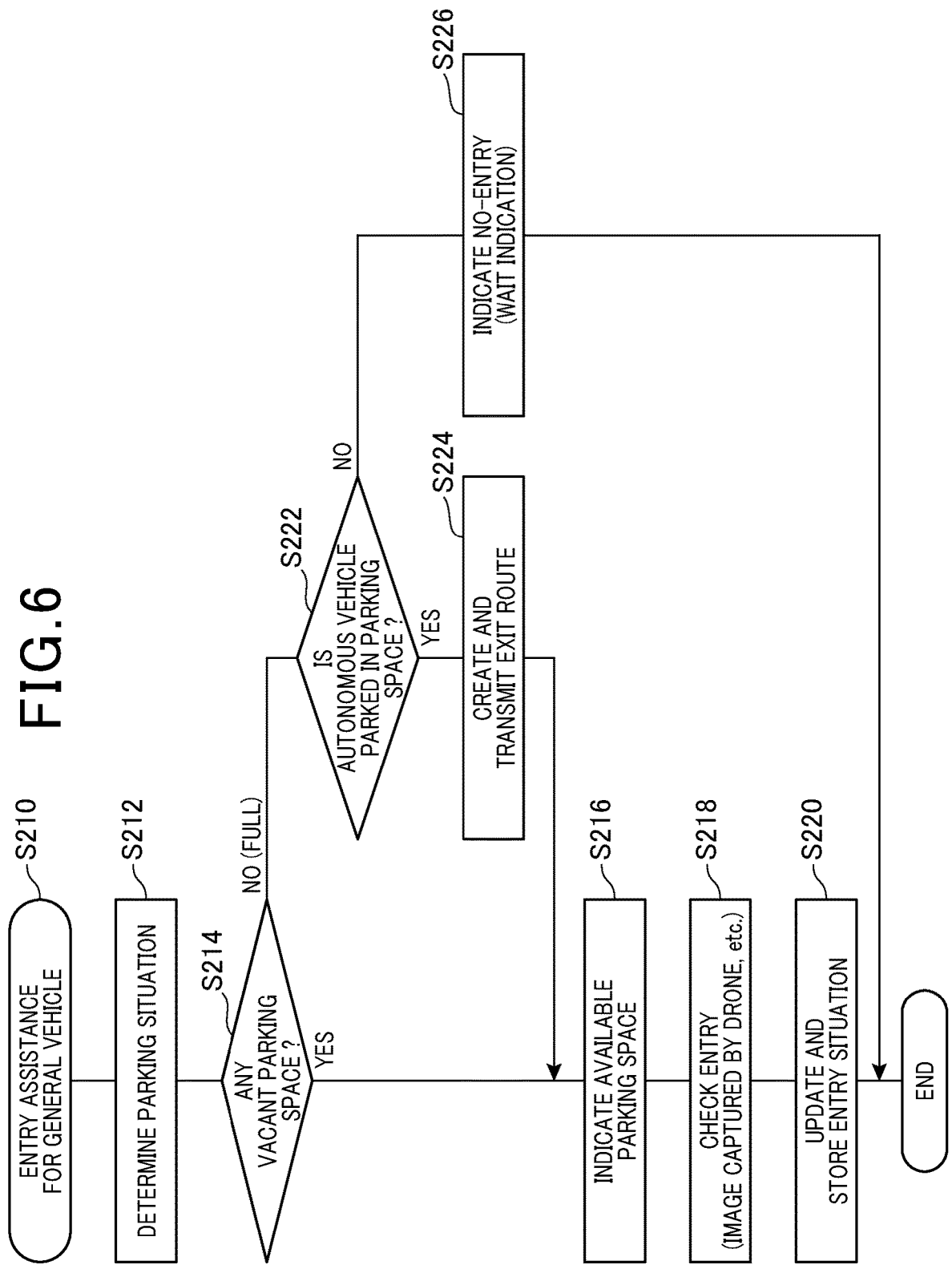
FIG. 6 is a flowchart showing a procedure of entry assistance in the entry/exit control on the general vehicle.

The entry assistance in Step S210 is implemented by the management unit 200 following the sequence shown in FIG. 6; first, the current parking situation is determined on the basis of the entry information of the parking space Pe stored in the entry information storage 202 (Step S212). Next, whether there is a vacant parking space Pe at present is determined (Step S214), and when there is a vacant parking space Pe, the general vehicle driver MMh of the general vehicle MM is informed of an available parking space Pe by an alarm device such as a loudspeaker and a text display device, which are not shown in the drawings, installed near the entrance Pi in FIG. 1, in order to provide assistance to the general vehicle MM to enter said vacant parking space Pe (Step S216). For example, in the vehicle parking situation in FIG. 1, the general vehicle driver MMh is informed that the parking spaces Pe at Nos. 4 and 8 in the row A and Nos. 3, 4, and 8 in the row B are available. Note that when the general vehicle MM is equipped with a car navigation system capable of receiving external audio signals, an audio signal about the available parking space Pe may be transmitted to said car navigation system to indicate the available parking space Pe.

Thereafter, by analyzing the image captured by the mobile body 100, the management unit 200 checks which parking space Pe the general vehicle MM (assisted vehicle) has entered (Step S218). Subsequently, when the checking result shows that the general vehicle MM has entered the parking space Pe at No. 8 in the row B, for example, the management unit 200 updates the entry information stored in the entry information storage 202 and stores entry information indicating that the general vehicle MM is stored in the parking space Pe at No. 8 in the row B (Step S220), and ends the control for the moment.

On the other hand, in the case where the absence of vacant parking spaces Pe is determined in Step S214 mentioned above, all the parking spaces Pe are occupied, as shown in FIG. 4. Even in this case, in order to provide the entry assistance for the general vehicle MM, subsequent to negative determination (fully occupied determination) in Step S214, the management unit 200 determines, on the basis of the entry information stored in the entry information storage 202, whether the autonomous vehicle driver AMh is parked in the parking space Pe (Step S222). To take the fully occupied status shown in FIG. 4 as an example; in Step S222, it is assumed that the autonomous vehicles AM are parked in the parking spaces Pe (occupied spaces) at Nos. 1, 3, 5, 7, and 8 in the row A and Nos. 1, 2, 4, 6, 8, and 10 in the row B. The autonomous vehicle AM parked in the occupied space is at the use obstructing position in which the entry of the general vehicle MM (assisted general vehicle STM) which is a target of the entry assistance is obstructed.

Therefore, in order to provide entry assistance for the assisted general vehicle STM, the management unit 200 transmits the travel signal to the autonomous vehicle AM (auxiliary assist vehicle SHM) parked in the parking space Pe at No. 8 in the row A which is closest to the assisted general vehicle STM (general vehicle MM) that has arrived at the entrance Pi to enter the parking lot P, for example, among the autonomous vehicles AM parked in the aforementioned occupied spaces. Specifically, the route creation unit 204 creates a travel signal about the travel route from the parking space Pe at No. 8 in the row A to an available position in which the entry of the assisted general vehicle STM into the parking space Pe at No. 8 in the row A is not obstructed, and transmits the created travel route to the autonomous vehicle AM parked in the parking space Pe at No. 8 as the travel signal (Step S224).

Figure 7:
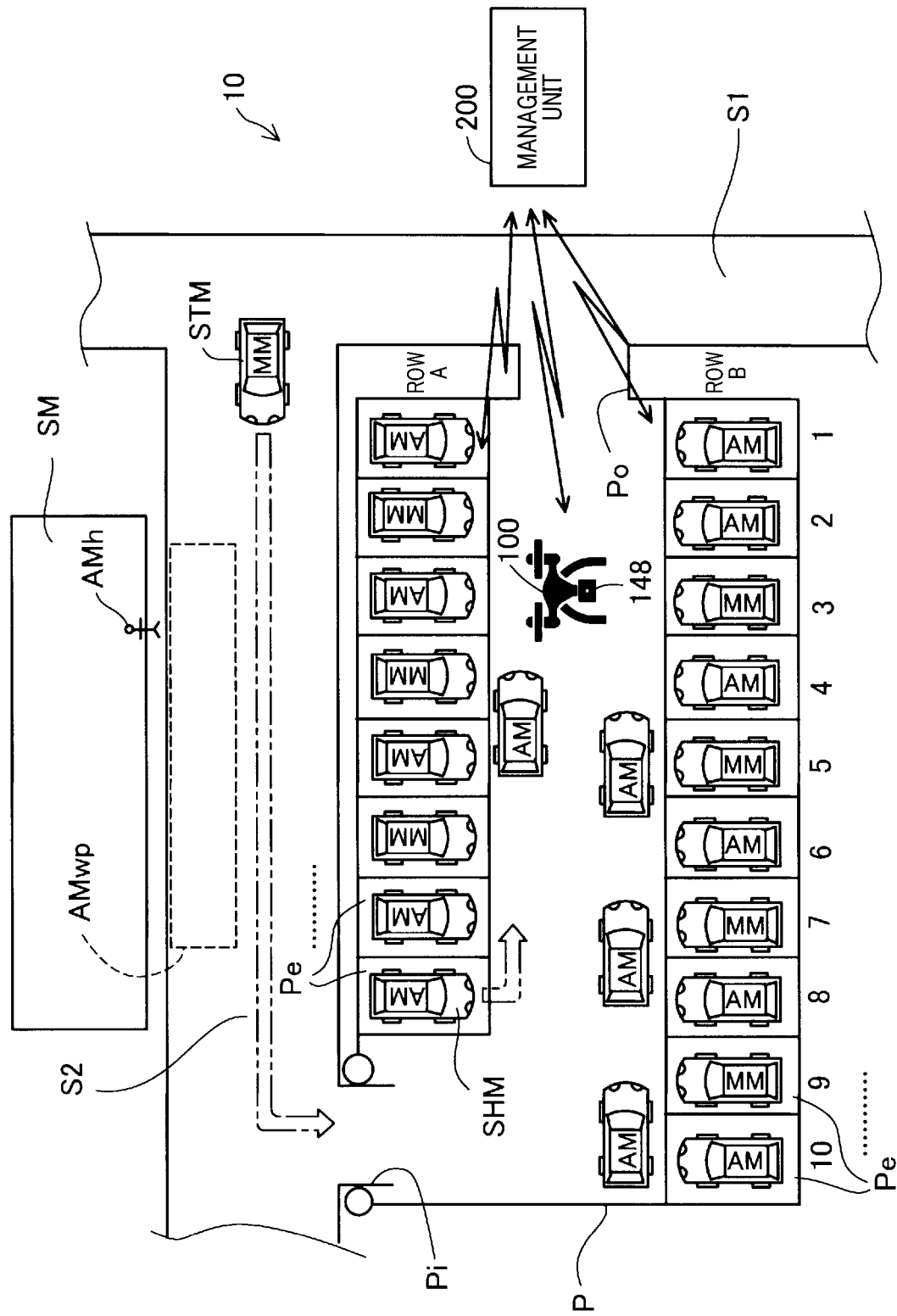
FIG. 7 is an explanatory diagram showing an initial situation for the autonomous vehicle during an exit travel along with entry assistance for the general vehicle.
Figure 8:
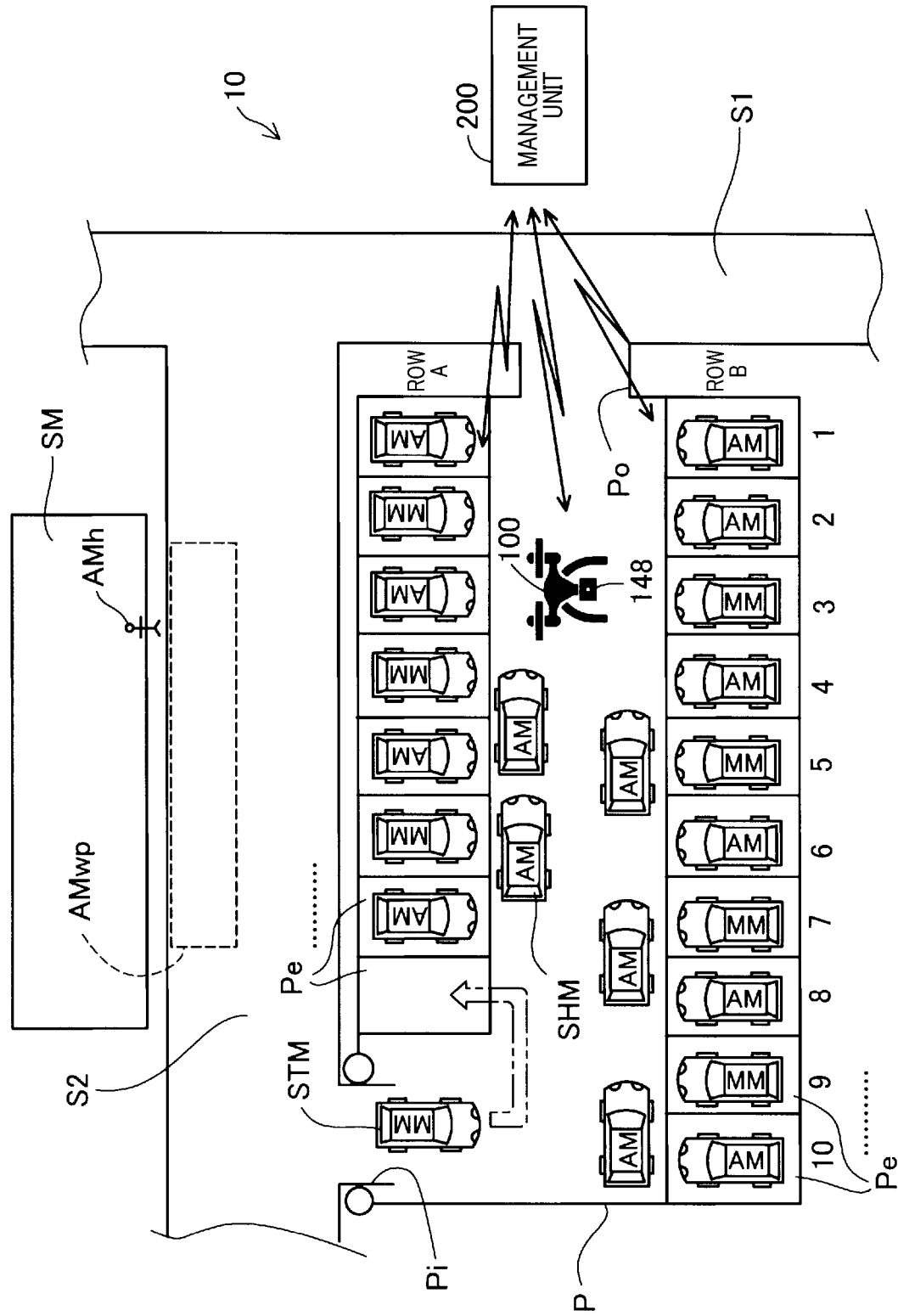
FIG. 8 is an explanatory diagram showing the exit travel of the autonomous vehicle and an entry situation for the general vehicle along with the entry assistance for the general vehicle.

The auxiliary assist vehicle SHM which is the autonomous vehicle AM parked in the parking space Pe at No. 8 in the row A receives the travel signal and then, as shown in FIG. 7, exits the parking space Pe at No. 8 in the row A, moves to an available position, for example, the travel space in front of the parking spaces Pe at Nos. 6 and 7 in the row A, the travel space in front of the parking spaces Pe at Nos. 1 and 2 in the row A, or the travel space in front of the parking spaces Pe at Nos. 1 and 2 in the row B, and then is stopped. Accordingly, as shown in FIG. 8, the parking space Pe at No. 8 in the row A becomes vacant, the processing transitions to Step S216 described earlier, the general vehicle driver MMh of the assisted general vehicle STM is informed of the available parking space Pe, and subsequently the entry of the general vehicle MM is checked (Step S218), the entry information is updated and stored (Step S220), and the control is ended for the moment. Note that the entry information in this case is updated to include information to the effect that the general vehicle MM is stored in the parking space Pe at No. 8 in the row A, and then is stored.

In FIG. 7, when the general vehicle MM is parked in the parking space Pe at No. 8 in the row A, the autonomous vehicle AM parked in the parking space Pe at No. 7 in the row A, No. 3 in the row A, No. 2 in the row B, or the like is set as the auxiliary assist vehicle SHM, and the travel signal for traveling to the available position is transmitted to said auxiliary assist vehicle SHM in Step S224.

In the case where the parking lot P is larger than that shown in FIG. 1 and accommodate a few dozens to at least a hundred vehicles, the travel signal may be transmitted in Step S224 as follows. First, one of the autonomous vehicles AM parked in the parking spaces Pe within a predetermined range of distances such as 50 m and 100 m centered on the assisted general vehicle STM that has arrived at the entrance Pi is set as the auxiliary assist vehicle SHM. Furthermore, a travel route from the parking space Pe in which the auxiliary assist vehicle SHM is parked to an available position in which the entry into said parking space is not obstructed is created, and the created travel route is transmitted to said auxiliary assist vehicle as a travel signal.

On the other hand, in the case where the parking lot is determined as being fully occupied in Step S214 described earlier and the parking spaces Pe are determined as including no autonomous vehicles AM in Step S222 described earlier, no autonomous vehicles AM are parked in the parking spaces Pe. In this case, the entry assistance for the general vehicle MM by means of the autonomous vehicle AM parked in the parking space Pe is not possible, and thus the management unit 200 informs the general vehicle driver MMh of the general vehicle MM that the entry is not possible at present (Step S226), and ends the control for the moment.

Figure 5:
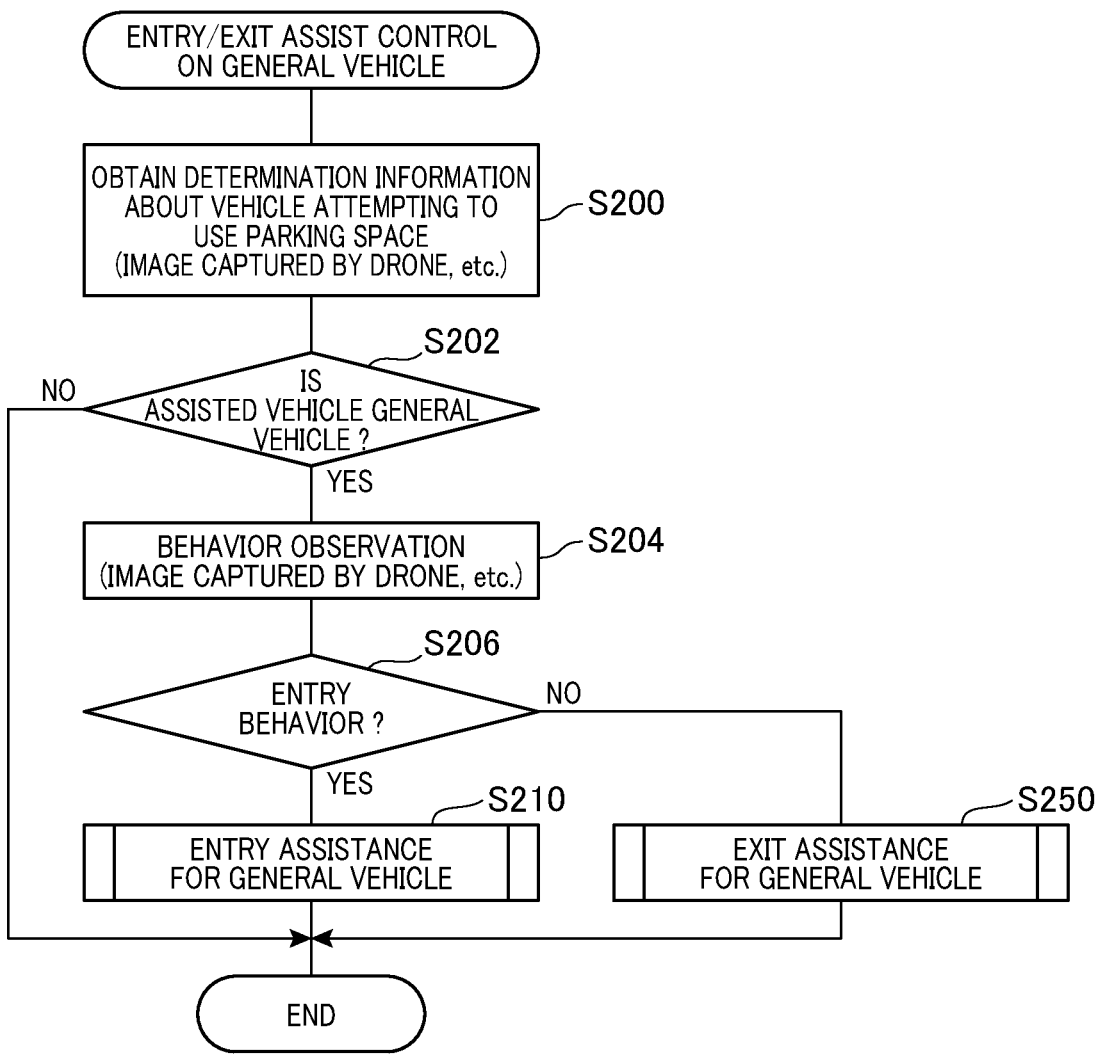
FIG. 5 is a flowchart showing an entry/exit assist control on a general vehicle in the parking assist system.
Figure 9:
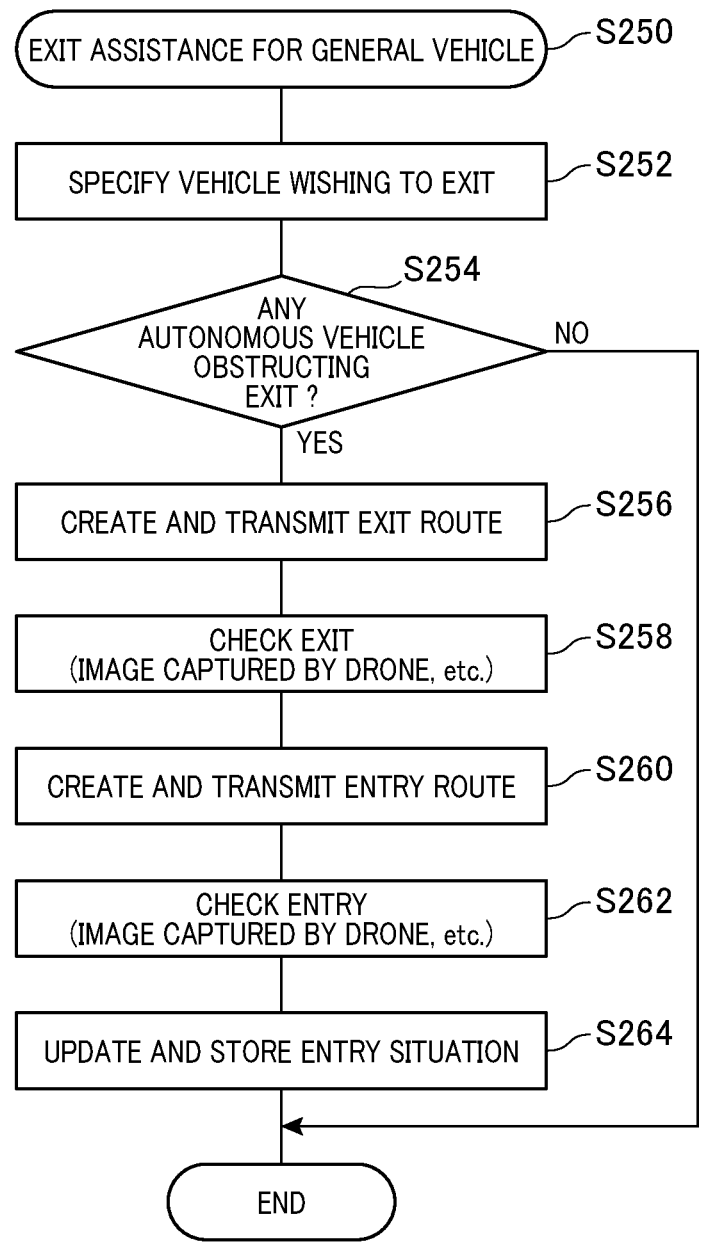
FIG. 9 is a flowchart showing a procedure of exit assistance in the entry/exit control on the general vehicle.

The exit assistance for the general vehicle MM in Step S250 in FIG. 5 is implemented by the management unit 200 following the procedure shown in FIG. 9; first, a general vehicle MM wishing to exit and the parking space Pe in which said vehicle is parked are specified from the behavior observed in Step S204 in FIG. 5, specifically, the driver-seat boarding behavior of a pedestrian approaching the vehicle parked in the parking space Pe, the steering (steering wheel gripping) behavior of the pedestrian after boarding, and subsequent small pull-away behavior, and the like. Next, whether an autonomous vehicle AM is parked at the use obstructing position in which the exit of the specified general vehicle MM is obstructed is determined (Step S254). This determination about the use obstruction in Step S254 and the subsequent treatment will be described with reference to FIG. 10.

When the general vehicle MM wishing to exit is specified in Step S252 as a general vehicle MM parked in the parking space Pe at No. 5 in the row B from, for example, the behavior of the general vehicle driver MMh getting in the driver seat of the parked general vehicle MM, there is no autonomous vehicle AM that obstructs the exit of this general vehicle MM. Thus, in this case, the general vehicle MM parked in the parking space Pe at No. 5 in the row B is not an assisted general vehicle STM and therefore, it is determined in Step S254 that there is no autonomous vehicle AM that obstructs the exit, leading to the end of the control with no process performed. Note that by way of image capture by the camera 148 of the mobile body 100 and analysis of the captured image, the vacant space specifying unit 104 updates the status of the parking space Pe at No. 5 in the row B that has changed to the vacant status as a result of the exit of the general vehicle MM.

In the case where the general vehicle MM wishing to exit is specified in Step S252 as a general vehicle MM parked in the parking space Pe at No. 7 in the row B from, for example, the behavior of the general vehicle driver MMh getting in the driver seat of the parked general vehicle MM, an autonomous vehicle AM is parked in the travel space in front of the parking spaces Pe at Nos. 7 and 8 in the row B, meaning that this autonomous vehicle AM is parked at the use obstructing position in which the exit of this general vehicle MM from the parking space Pe at No. 7 in the row B is obstructed. Thus, in this case, since the autonomous vehicle AM obstructs the exit of the general vehicle MM parked in the parking space Pe at No. 7 in the row B, the general vehicle MM parked in the parking space Pe at No. 7 in the row B is the assisted general vehicle STM; in Step S254, the presence of the autonomous vehicle AM that obstructs the exit is determined, and the processing transitions to Step S256 in order to provide exit assistance.

Figure 10:
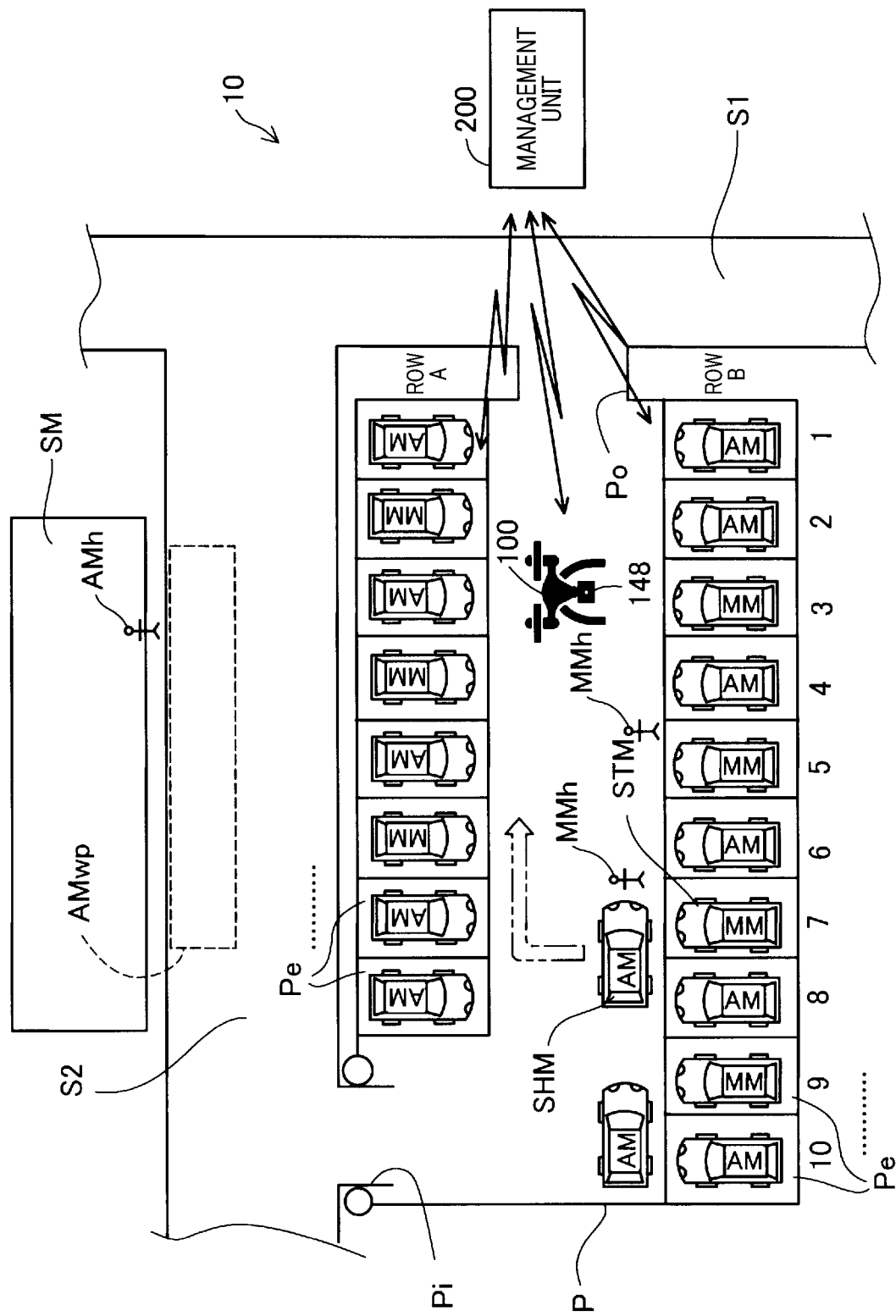
FIG. 10 is an explanatory diagram showing the initial situation for the autonomous vehicle during self-driving along with exit assistance for the general vehicle.
Figure 11:
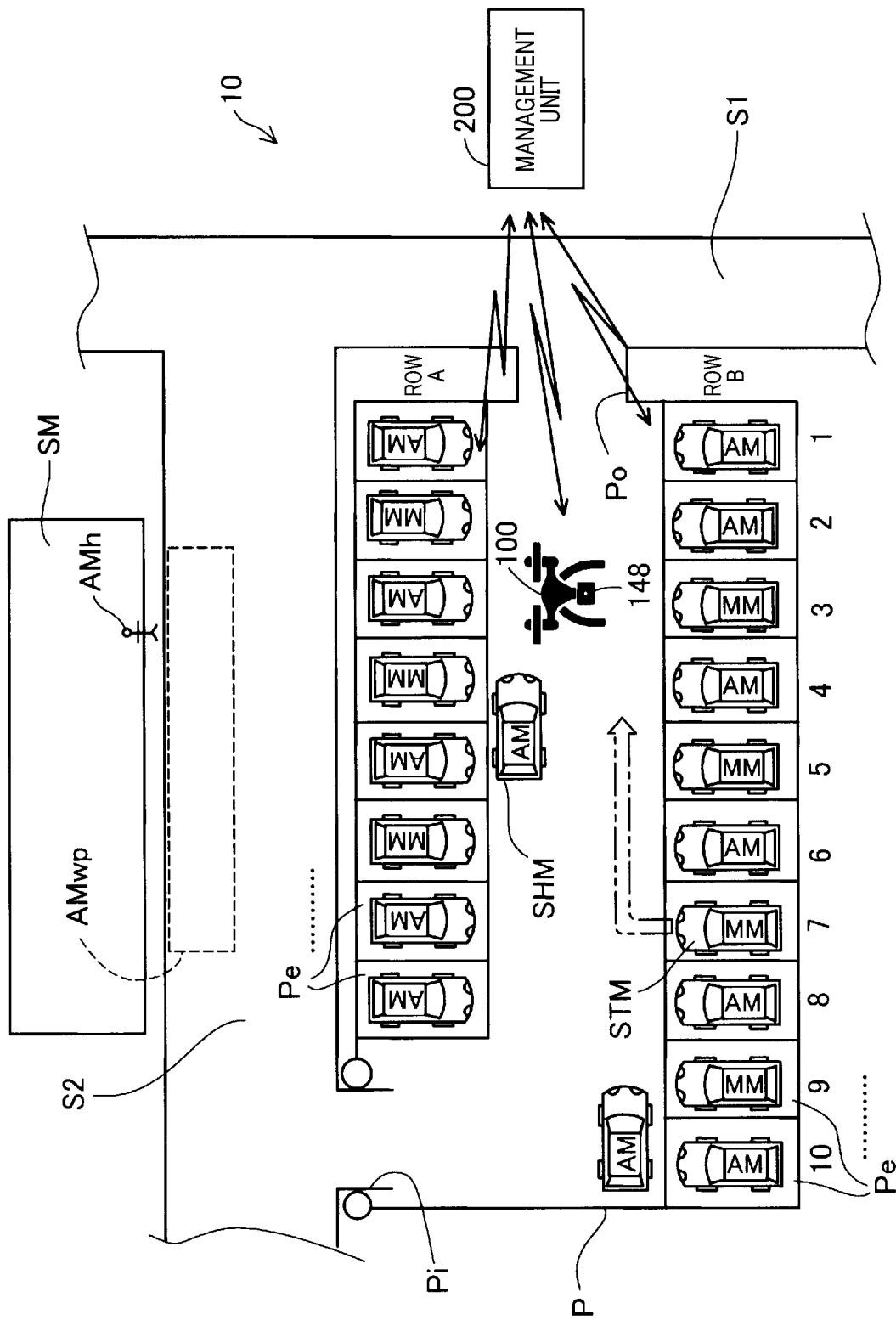
FIG. 11 is an explanatory diagram showing self-driving of the autonomous vehicle and an exit situation for the general vehicle along with the exit assistance for the general vehicle.

In Step S256, in order to provide the exit assistance for the assisted general vehicle STM, the management unit 200 sets, as the auxiliary assist vehicle SHM, the autonomous vehicle AM parked in the travel space in front of the parking spaces Pe at Nos. 7 and 8 in the row B, and transmits the travel signal to the auxiliary assist vehicle SHM. Specifically, the route creation unit 204 creates a travel route to an available position in which the exit of the assisted general vehicle STM parked in the parking space Pe at No. 7 in the row B is not obstructed, and transmits the created travel route as the travel signal to the auxiliary assist vehicle SHM parked in the travel space in front of the parking spaces Pe at Nos. 7 and 8 in the row B. As shown in FIG. 10, the auxiliary assist vehicle SHM that has received the travel signal drives itself from the travel space in front of the parking spaces Pe at Nos. 7 and 8 in the row B to an available position, for example, the travel space in front of the parking spaces Pe at Nos. 4 and 5 in the row A, and then is stopped. This allows the assisted general vehicle STM parked in the parking space Pe at No. 7 in the row B to exit said parking space Pe without trouble, as shown in FIG. 11.

Figure 12:
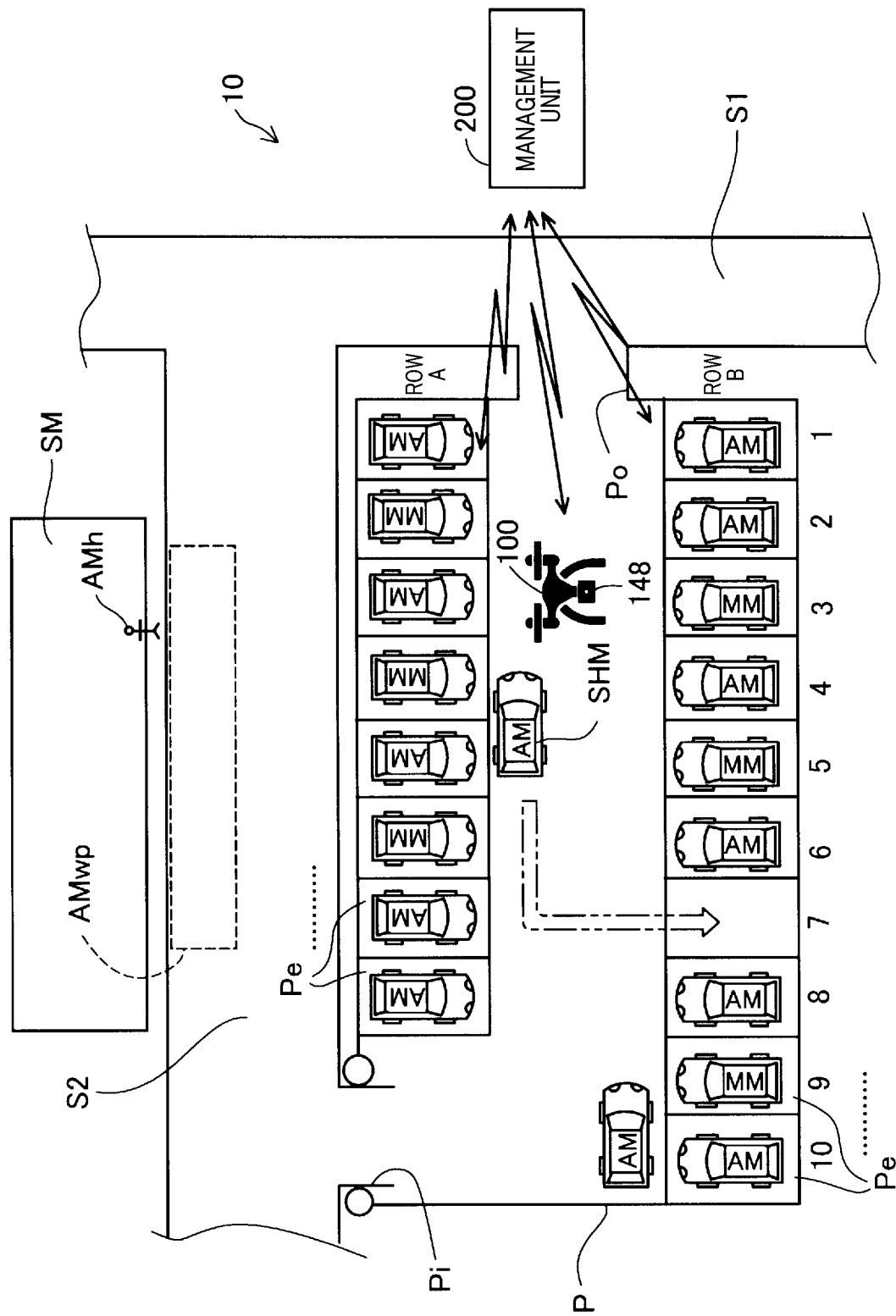
FIG. 12 is an explanatory diagram showing a post-exit-assistance travel situation for the autonomous vehicle that has driven itself along with the exit assistance for the general vehicle.

In Step S258 subsequent to Step S256, the exit of the assisted general vehicle STM is checked by analyzing the image transmitted from the mobile body 100. Next, the management unit 200 transmits the travel signal to the auxiliary assist vehicle SHM caused to drive itself to the travel space in front of the parking spaces Pe at Nos. 4 and 5 in the row A in order to provide the exit assistance for the assisted general vehicle STM (Step S260). Specifically, the route creation unit 204 creates the travel route from the travel space in front of the parking spaces Pe at Nos. 4 and 5 in the row A to the parking pace Pe at No. 7 in the row B, and the created travel signal is transmitted to the auxiliary assist vehicle SHM as the travel signal. The auxiliary assist vehicle SHM receives this travel signal, and as shown in FIG. 12, drives itself from the travel space in front of the parking spaces Pe at Nos. 4 and 5 in the row A, and enters the parking space Pe at No. 7 in the row B which the assisted general vehicle STM has exited. The management unit 200 checks the entry of the auxiliary assist vehicle SHM, i.e., the autonomous vehicle AM, by analyzing the image captured by the mobile body 100 (Step S262). Subsequently, the management unit 200 updates the entry information stored in the entry information storage 202 and stores entry information indicating that the autonomous vehicle AM is stored the parking space Pe at No. 7 in the row B (Step S264), and ends the control for the moment.

As described above, the parking assist system 10 according to the present embodiment sets, as an auxiliary assist vehicle SHM, the autonomous vehicle AM that obstructs the assisted general vehicle STM, which is a general vehicle MM, from entering or exiting the parking space Pe, and causes the auxiliary assist vehicle SHM to drive itself to the available position in which entry or exit of the assisted general vehicle STM into or from the parking space Pe is not obstructed (Steps S222 to S224, Steps S254 to S256). Thus, with the parking assist system 10 according to the present embodiment, the assisted general vehicle STM can be assisted in a preferred manner to enter or exit the parking space Pe.

With the parking assist system 10 according to the present embodiment, when the parking lot P is full, the autonomous vehicle AM parked in the parking space Pe at No. 8 in the row A that is closest to the assisted general vehicle STM that has arrived at the entrance Pi is set as an auxiliary assist vehicle SHM, and this auxiliary assist vehicle SHM is caused to drive itself to the available position in which the entry of the assisted general vehicle STM into the parking space Pe at No. 8 in the row A is not obstructed (Steps S222 to S224). Thus, with the parking assist system 10 according to the present embodiment, the assisted general vehicle STM that has arrived at the entrance Pi can be promptly assisted to enter the nearest parking space Pe at No. 8 in the row A.

The parking assist system 10 according to the present embodiment sets, as an auxiliary assist vehicle SHM, one of the autonomous vehicles AM parked in the parking spaces Pe within the predetermined range of distances such as 50 m and 100 m centered on the assisted general vehicle STM that has entered the parking lot P through the entrance Pi, and transmits, to the auxiliary assist vehicle SHM, the travel signal about the route to the available position. Thus, with the parking assist system 10 according to the present embodiment, the assisted general vehicle STM that has arrived at the entrance Pi can be promptly assisted to enter the parking space Pe located within a predetermined distance range. More appropriate entry assistance for the assisted general vehicle STM is possible by setting the predetermined distance range according to the size of the parking lot.

The parking assist system 10 according to the present embodiment uses, as the mobile body 100, an unmanned aerial vehicle (drone) that flies above the parking lot P, captures, by the mobile body 100, images of various kinds of vehicle behavior such as getting-in of the general vehicle driver MMh into the driver seat of the general vehicle MM (Step S200), and senses the assisted general vehicle STM (Step S202) and senses the entry or the exit (Step S206) on the basis of the captured images. Thus, with the parking assist system 10 according to the present embodiment, the mobile body 100 can follow the general vehicle driver MMh, the general vehicle MM, and the like and capture images thereof, enabling improvement in sensing accuracy and allowing for a reduction in the number of devices required to capture images of behavior, such as sensors and cameras that are securely installed.

The parking assist system 10 according to the present embodiment causes the autonomous vehicle AM obstructing the exit of the assisted general vehicle STM, which is a general vehicle MM, to drive itself, as an auxiliary assist vehicle SHM, to the available position in which the exit is not obstructed (Steps S254 to S256), and causes the autonomous vehicle AM serving as the auxiliary assist vehicle SHM that has moved to the available position to drive itself and enter the parking space Pe which the assisted general vehicle STM has exited (Steps S260 to S262). Thus, with the parking assist system 10 according to the present embodiment, the parking space Pe can be efficiently used.

Other Embodiments (1) In the above embodiment, the captured image for sensing a vehicle, entry, exit, and the like is obtained from the mobile body 100 which is an unmanned aerial vehicle (drone) that flies above the parking lot P, but the camera 148 may be mounted on a small unmanned self-driving car capable of autonomous movement, and the captured image may be obtained from this small unmanned self-driving car. Furthermore, images captured by a plurality of surveillance cameras installed in various portions of the parking lot P, instead of the mobile body 100, may be used.

(2) In the above embodiment, the image captured by the camera 148 mounted on the mobile body 100 is used to sense an assisted general vehicle STM and sense the entry/exit. However, data including information indicating that the target vehicle is a general vehicle may be transmitted from a general vehicle MM so that an assisted general vehicle STM can be sensed, and data including entry/exit information similar to the entry/exit request from an autonomous vehicle AM may be transmitted from a general vehicle MM so that the entry/exit can be sensed.

(3) The above embodiment shows an example in which a single mobile body 100 is used, but two or more mobile bodies 100 may be used to sense the assisted general vehicle STM and sense the entry/exit. In such a case of using the plurality of mobile bodies 100, the parking lot P may be divided into sections that are used as regions for flying operation and capturing images for the mobile bodies 100. This allows more reliable sensing of the assisted general vehicle STM and the entry/exit in a shorter time than in the case of specifying a parking space Pe by a single mobile body 100.

(4) In the above-described embodiments, a part of the configuration implemented using hardware may be changed to be implemented using software, or conversely a part of the configuration implemented using software may be changed to be implemented using hardware. When some or all of the functions in the present disclosure are implemented using software, this software (computer program) may be provided as a computer-readable recording medium having the software (computer program) stored therein. The "computer-readable recording medium" is not limited to a portable recording medium such as a flexible disk or a CD-ROM, but includes an internal storage device installed in a computer, such as various types of RAM or ROM, and an external storage device fixed to a computer, such a hard disk drive. In other words, the "computer-readable recording medium" is used in a broad sense to include an arbitrary non-transitory recording medium that can store data packets.

The present disclosure is not limited to the above-described embodiments and can be implemented with various configurations within the spirit and scope of the present disclosure. For example, technical features in the embodiments that correspond to technical features of the aspect described in the Summary section can be replaced or combined, as appropriate, in order to solve part or all of the earlier-described problems or in order to achieve part or all of the earlier-described advantageous effects. Technical features can be deleted, as appropriate, unless the technical features are explained in this Description as essential.

The present disclosure, which responds to the demand for a new parking assist method to be used under a situation in which an autonomous vehicle and a general vehicle are parked side by side, can be implemented in the following form.

According to one aspect of the present disclosure, a parking assist system (10) is provided. This parking assist system is used in a parking lot (P) including parking spaces (Pe) for a plurality of vehicles and includes: a vehicle sensor (200) which determines whether an assisted vehicle attempting to enter or exit one of the parking spaces is a general vehicle (MM) that travels through vehicle operation by a driver or an autonomous vehicle (AM) capable of self-driving according to an external travel signal; and a travel signal transmitter (204) which, when the assisted vehicle is determined as the general vehicle, transmits, to a specific autonomous vehicle among parked autonomous vehicles, a travel signal for traveling to an available position for enabling the entry or the exit of the assisted vehicle.

With the parking assist system according to this aspect, when the assisted vehicle is a general vehicle, an autonomous vehicle that is obstructing the general vehicle from using a parking space is caused to move, and thus the general vehicle as an assisted vehicle can be assisted to enter and exit the parking space.

The present disclosure can be implemented in various forms other than the parking assist system. For example, the present disclosure can be implemented in forms such as a parking assist method, a computer program for performing said method, and a storage medium having said computer program recorded thereon.

What is claimed is:

1. A parking assist system for use in a parking lot including parking spaces for a plurality of vehicles, the parking assist system comprising:
a vehicle sensor that determines whether an assisted vehicle is attempting to enter or exit one of the parking spaces, and determines whether the assisted vehicle is either a general vehicle that travels according to vehicle operation by a driver or an autonomous vehicle that performs self-driving according to an external travel signal; and
a travel signal transmitter that transits, when the assisted vehicle is determined to be attempting to enter or exit the one of the parking spaces and determined to be a general vehicle, to a specific autonomous vehicle among parked autonomous vehicles that is parked at a use obstructing position in which the assisted vehicle is obstructed from attempting to enter or exit the one of the parking spaces, a travel signal to travel from the use obstructing position to an available position in which that assisted vehicle is not obstructed from attempting to enter or exit the one of the parking spaces.

2. The parking assist system according to claim 1, wherein the vehicle sensor determines whether use of the one spaces by the general vehicle determined as the assisted vehicle comprises entry into the one of the parking spaces or exit from the one of the parking spaces, and when the vehicle sensor determines that the use of the one of the parking spaces by the general vehicle determined as the assisted vehicle comprises entry into the one of the parking spaces or exit from the one of the parking spaces, the travel signal transmitter transmits to an autonomous vehicle parked at a use obstructing position, in which the assisted vehicle is obstructed from entry into the one of the parking spaces or exit from the one of the parking spaces, a travel signal for traveling from the use obstructing position to the available position in which the entry or the exit of the assisted vehicle is not obstructed.

3. The parking assist system according to claim 2, wherein when the use of the one of the parking spaces by the general vehicle determined as the assisted vehicle is the entry, the travel signal transmitter transmits the travel signal to one of the parked autonomous vehicles in the parking spaces located within a predetermined distance range from the general vehicle.

4. The parking assist system according to claim 1, wherein the vehicle sensor includes a mobile body which observes an entering vehicle entering the parking lot and vehicles parked in the parking spaces, and determines, on the basis of an observation result obtained by the mobile body, whether the assisted vehicle is the general vehicle or the autonomous vehicle.

5. The parking assist system according to claim 4, wherein the mobile body captures images of the entering vehicle and the vehicles parked, and the vehicle sensor determines, on the basis of the images captured by the mobile body, whether the assisted vehicle is the general vehicle or the autonomous vehicle.

6. A parking assist method for use in a parking lot including parking spaces for a plurality of vehicles, the parking assist method comprising:

determining whether an assisted vehicle is attempting to enter or exit one of the parking spaces, and determines whether the assisted vehicle is either a general vehicle that travels according to vehicle operation by a driver or an autonomous vehicle that performs self-driving according to an external travel signal; and transmitting a travel signal to a specific autonomous vehicle that is parked at a use obstructing position in which the assisted vehicle is obstructed from attempting to enter or exit the one of the parking spaces in response to the assisted vehicle is determined to be attempting to enter or exit the one of the parking spaces and determined to be a general vehicle, the travel signal being used for traveling from the use obstructing position to an available position in which the assisted vehicle is not obstructed from attempting to enter or exit the one of the parking spaces.

* * * * *